United States Patent
Stevens et al.

(10) Patent No.: US 7,519,353 B2
(45) Date of Patent: Apr. 14, 2009

(54) MULTI-MVNO WIRELESS SERVICE

(75) Inventors: Gilman Stevens, Fairview, TX (US);
Michael Gibson, Evergreen, CO (US);
Jim Anderson, Columbine Valley, CO (US); Rich Cerami, Denver, CO (US);
Andrew White, Columbus, OH (US)

(73) Assignee: Qwest Communications International Inc., Denver, CO (US)

( * ) Notice: Subject to any disclaimer, the term of this patent is extended or adjusted under 35 U.S.C. 154(b) by 421 days.

(21) Appl. No.: 11/190,383

(22) Filed: Jul. 26, 2005

(65) Prior Publication Data

US 2007/0026853 A1    Feb. 1, 2007

(51) Int. Cl.
*H04M 11/00*    (2006.01)
(52) U.S. Cl. .................. 455/407; 455/405; 455/406; 455/408; 455/445; 455/552.1; 379/114.01
(58) Field of Classification Search ... 455/452.1–452.2, 455/446, 423, 67.11, 405–408, 456.1, 552.1, 455/445, 435.1, 432.1; 379/114.01, 114.02; 705/52
See application file for complete search history.

(56) References Cited

U.S. PATENT DOCUMENTS

| | | | | |
|---|---|---|---|---|
| 5,134,651 A | * | 7/1992 | Ortiz et al. | 379/144.08 |
| 5,175,867 A | | 12/1992 | Wejke et al. | |
| 5,303,297 A | * | 4/1994 | Hillis | 455/406 |
| 5,586,338 A | * | 12/1996 | Lynch et al. | 455/433 |
| 5,606,602 A | * | 2/1997 | Johnson et al. | 379/114.02 |
| 5,613,213 A | * | 3/1997 | Naddell et al. | 455/435.2 |
| 5,764,741 A | * | 6/1998 | Barak | 379/114.02 |
| 5,796,772 A | | 8/1998 | Smith et al. | |
| 5,802,468 A | * | 9/1998 | Gallant et al. | 455/422.1 |
| 5,878,349 A | | 3/1999 | Dufour et al. | |
| 5,903,832 A | * | 5/1999 | Seppanen et al. | 455/435.3 |
| 5,915,214 A | * | 6/1999 | Reece et al. | 455/406 |
| 5,983,092 A | * | 11/1999 | Whinnett et al. | 455/406 |
| 6,101,379 A | * | 8/2000 | Rahman et al. | 455/406 |
| 6,208,875 B1 | | 3/2001 | Damgaard et al. | |
| 6,226,527 B1 | | 5/2001 | Dalsgaard et al. | |
| 6,393,279 B1 | | 5/2002 | Lee | |
| 6,424,638 B1 | | 7/2002 | Ray et al. | |
| 6,430,408 B1 | * | 8/2002 | Dorenbosch | 455/414.1 |
| 6,516,184 B1 | | 2/2003 | Damgaard | |
| 6,532,366 B1 | * | 3/2003 | Chung et al. | 455/445 |
| 6,580,921 B1 | | 6/2003 | Inoue et al. | |
| 6,681,118 B2 | | 1/2004 | Raffel et al. | |
| 6,690,929 B1 | * | 2/2004 | Yeh | 455/406 |
| 6,704,563 B1 | * | 3/2004 | Senn et al. | 455/406 |
| 6,714,760 B2 | | 3/2004 | Robinett | |
| 6,725,159 B2 | | 4/2004 | Krasner | |
| 6,819,920 B2 | | 11/2004 | Shi et al. | |

(Continued)

*Primary Examiner*—Sharad Rampuria
(74) *Attorney, Agent, or Firm*—Townsend and Townsend and Crew LLP (57) ABSTRACT

Systems and methods for determining an optimal range of frequencies of electromagnetic waves are described. In some embodiments, mobile voice communications devices measure average power received from certain ranges of such frequencies, each range associated with a communications service provider. A cost may be associated with each range. An optimal range of frequencies may be determined based on these factors. Each device may also receive a set of data identifying the location of the device. Each device may transmit one or more communications signals to a CIP with such measurements and location information, and some of this information may be stored in a database.

31 Claims, 6 Drawing Sheets

U.S. PATENT DOCUMENTS

| | | |
|---|---|---|
| 6,853,851 B1 | 2/2005 | Rautiola et al. |
| 6,859,653 B1 * | 2/2005 | Ayoub et al. ............. 455/435.2 |
| 6,868,270 B2 | 3/2005 | Dent |
| 6,904,029 B2 | 6/2005 | Fors et al. |
| 6,912,277 B1 * | 6/2005 | Mashinsky et al. ...... 379/114.12 |
| 7,043,225 B1 * | 5/2006 | Patel et al. ................. 455/405 |
| 7,184,749 B2 * | 2/2007 | Marsh et al. ................ 455/408 |
| 2002/0072333 A1 * | 6/2002 | Gnesda et al. ............. 455/67.1 |
| 2002/0085516 A1 | 7/2002 | Bridgetall |
| 2002/0176377 A1 * | 11/2002 | Hamilton .................... 370/328 |
| 2003/0021253 A1 * | 1/2003 | Jung .......................... 370/338 |
| 2003/0050070 A1 * | 3/2003 | Mashinsky et al. .......... 455/452 |
| 2004/0002335 A1 | 1/2004 | Pan et al. |
| 2004/0162058 A1 * | 8/2004 | Mottes ....................... 455/411 |
| 2006/0083205 A1 * | 4/2006 | Buddhikot et al. .......... 370/338 |
| 2006/0223539 A1 * | 10/2006 | Claussen et al. ............ 455/438 |

* cited by examiner

MULTI-MVNO WIRELESS SERVICE

BACKGROUND OF THE INVENTION

The present invention relates generally to telecommunications, and more specifically to delivery of voice and data services in a wireless environment.

Mobile service providers are typically assigned, or purchase, ranges of electromagnetic frequencies to use for their wireless service. The service providers are typically granted exclusive use of a range of frequencies for a particular geographic area. Recent advances in telecommunications have impacted the mobile phone landscape and the use of this spectrum, and one significant advancement has been in the area of multi-mode mobile phones. A multi-mode phone is designed to work on more than one range of electromagnetic frequencies. The rising importance of multi-mode phones can be linked with GSM, which originated in the 900 MHz band, but expanded to other bands including the 1800 and 1900 MHz bands. Multi-mode phones have been valuable in enabling roaming as well. Some multi-mode phones can operate on both digital and analog networks.

Multi-mode phones continue to gain importance in enabling the introduction of so-called 3rd Generation ("3G") services and phones without having to give up the wide coverage of GSM. Almost all 3G phones sold are actually at least dual-mode phones. Many special challenges to producing multi-mode phones, such as finding ways to share and integrate components between the different standards, have been solved.

Different wireless service providers have different coverage areas and strengths. An area that may offer weak signal strength for one carrier may offer strong signal strength for another carrier. This can vary depending on, for example, cell tower placements or component technology. With the introduction of voice over IP ("VoIP") enabled mobile devices, service coverage can be even more variable. Furthermore, when a consumer typically enrolls in a wireless plan with a cellular service provider, he or she is required to sign an extended contract with a particular service provider. Once they enter the contract, however, a consumer typically loses many options. For example, the consumer may not have the ability to switch to an alternative provider without entering a new contract and purchasing a new phone. By way of example, if a consumer cannot get reception at work, he or she may not have the option of using their phone to connect to another carrier that has better signal strength at that location.

A similar problem has been addressed in telecommunications in the long distance landline market, as the number of telecom service resellers has grown. So called "10-10" access numbers provide consumers with alternative choices when it comes to long distance. For example, a particular service provider may be less expensive for intrastate long distance, while a different service provider may be less expensive for interstate long distance. Despite having a designated long distance carrier, the consumer has the option of using alternative services on a "per-call" basis.

However, even in landline solutions, the consumer often must ascertain the terms of service. The consumer must make decisions based on various criteria, such as cost and call quality, which can be impacted by time, call destination or even call duration. Typically, no service is offered to make an automatic selection based on criteria such as cost or call quality.

One development that has served to enable additional options for the consumer is the Mobile Virtual Network Operator ("MVNO"). As the term is typically used, an MVNO is a mobile operator that does not own its own spectrum and usually does not have its own network infrastructure. Instead, MVNOs may have business arrangements with traditional mobile operators to buy minutes of use for sale to their own customers. To date, most MVNOs are in Europe, although resellers in the United States are gaining popularity.

While MVNOs typically do not have their own infrastructure, some are deploying their own Mobile Switching Centers ("MSCs") or Service Control Points ("SCPs"). Some MVNO's deploy infrastructure in order to facilitate the means to offer value-added services. Other MVNOs may have control over the SIM card, branding, marketing, billing, and customer care operations. There exists a need in the art to further leverage and expand the enabling technology supporting MVNOs to provide consumers with additional service provider options through the use of multi-mode phones.

BRIEF SUMMARY OF THE INVENTION

Various embodiments of the invention provide systems and methods for determining an optimal range of frequencies of electromagnetic waves. According to some embodiments, a mobile voice communications device may be configured to receive a plurality of nonoverlapping ranges of frequencies of electromagnetic waves, and transmit a communications signal indicating an average power received for each range of the plurality. In some embodiments, a range may comprise a wireless signal from a wireless carrier operating a cellular system. Each range may be associated with a different provider of communications services, such as a provider offering cellular phone service or VoIP services.

A Controlled Interface Point ("CIP") in communication with the device may be configured to receive the communications signal indicating an average power received for each range, receive information from a database which associates a cost with each range, and determine the optimal range of frequencies based on those factors. The CIP may transmit a communications signal indicating the optimal range. In some embodiments, the device may further be configured to receive a communications signal indicating the optimal range, and establish a connection with the provider associated with the optimal range.

In various embodiments, the device may comprise a VoIP phone, or a cellular phone. In other embodiments, the device may be configured to receive and transmit a set of data identifying the location of the device, such as GPS coordinate data. The CIP may be configured to receive the location data and to store it in the database. In various embodiments, a device may be configured to terminate an existing connection to a provider not associated with the optimal range. The ongoing phone call may be transferred to a connection with the provider associated with the optimal range without disrupting the ongoing phone call. In certain embodiments, location data may be processed to calculate the probability of movement patterns of the device, and the optimal range may be further based on the probability of movement patterns. In some embodiments, information received from different devices may be stored in a database, and the optimal range of frequencies may be determined based on the information received from the different devices. The optimal range may be based, in part, on a security metric as well. According to some embodiments, a database with information that associates a cost and average power with each range of the plurality in different geographic regions is created. A device may query the database to receive information on the optimal range.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiments only, and is not intended to limit the scope, applicability or configuration of the invention. Rather, the ensuing description of the embodiments will provide those skilled in the art with an enabling description for implementing embodiments of the invention. Various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure.

Moreover, as disclosed herein, the terms "storage medium" or "storage media" may represent one or more devices for storing data, including read only memory (ROM), random access memory (RAM), magnetic RAM, core memory, magnetic disk storage mediums, optical storage mediums, flash memory devices or other machine readable mediums for storing information. The term "computer-readable medium" includes, but is not limited to, portable or fixed storage devices, optical storage devices, wireless channels and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as a storage medium. Processors may perform the necessary tasks.

Figure 1:
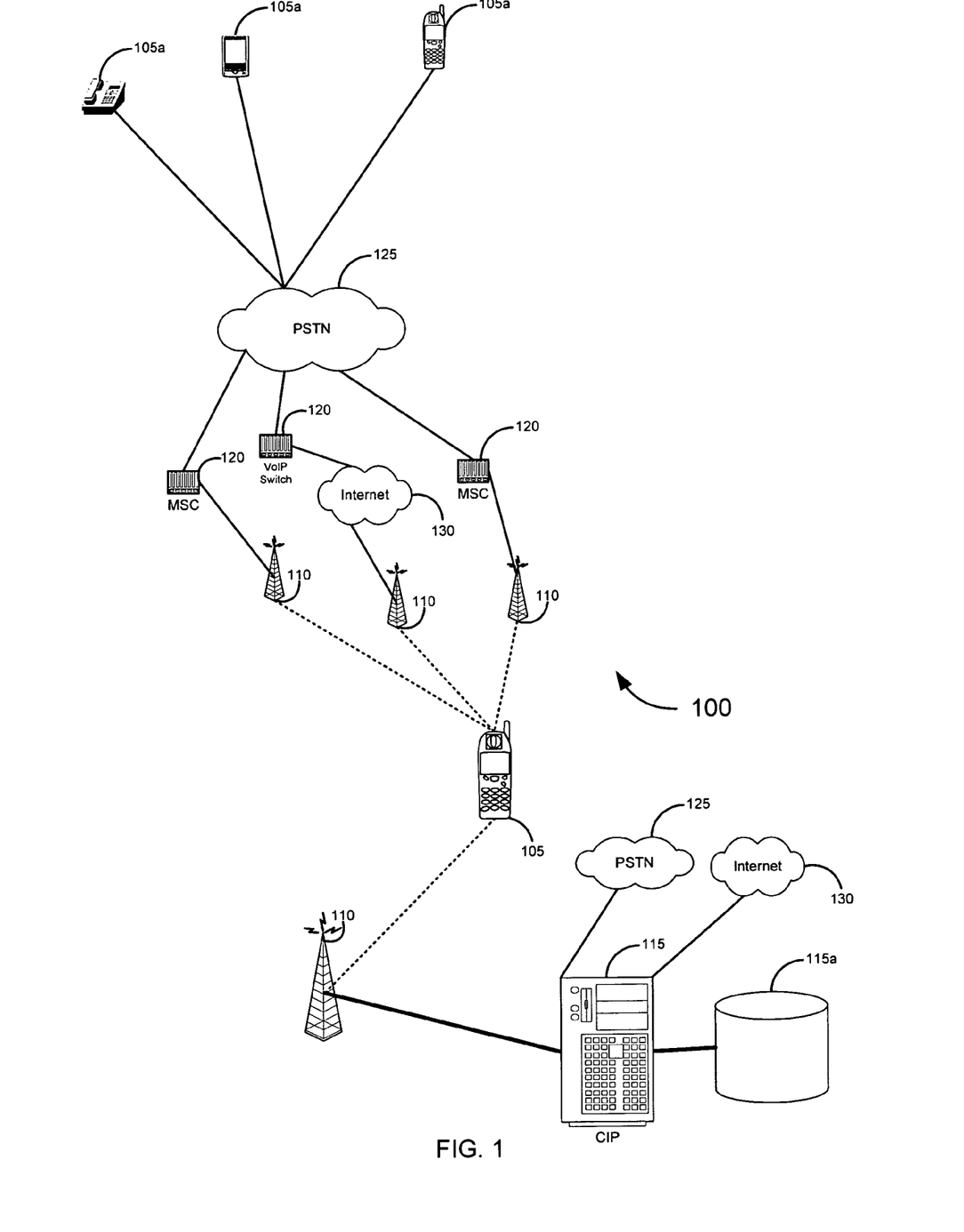
FIG. 1 illustrates a communications system that may be used to identify an optimal range of electromagnetic frequencies according to various embodiments of the present invention.

I. System Overview: Embodiments of the invention provide novel solutions, including systems, methods, and software, for directing the connection of a multi-mode voice communication device to an optimal service provider. Certain embodiments of the present invention are illustrated in FIG. 1. These embodiments may be included in a communications system 100, comprised of one or more Mobile Voice Communications Devices 105, a Mobile Communications Base Station 110, a Controlled Interface Point ("CIP") 115, and Service Provider Equipment 120 from a communications service provider. A description of these elements follows.

A. Device: According to different embodiments of the present invention, a Mobile Voice Communications Device 105 may be a cellular phone, a VoIP phone, a personal digital assistant, a pager, a text messaging device, a laptop, a portable digital music player, a two way radio, any mobile phone or other device that communicates voice, or any combination of the foregoing. According to some embodiments, the Mobile Voice Communications Device 105 communicates with the CIP 115 through a Mobile Communications Base Station 110, at least a portion of which is wireless.

As used herein, "cellular" may be interpreted in a broad sense to include any of the variety of known modes of wireless or mobile voice communications. Exemplary cellular systems include, but are not limited to, time division multiple access ("TDMA") systems, code division multiple access ("CDMA") systems, and Global System for Mobile communications ("GSM") systems. Other exemplary cellular systems include systems known in the art as "3G" systems (such as 1xRTT, EVDO, EVDV, and EDGE systems).

The term "VoIP" as used herein should be interpreted to mean any type of voice service that is provided over a data network, such as an Internet Protocol-based network. The term VoIP is intended to be interpreted broadly to include any system wherein a voice signal from a phone is converted into a digital signal that travels over a data network. VoIP also includes any system wherein a digital signal is converted into a audio signal that is delivered to a phone or other mobile voice communications device. A phone capable of VoIP mode communications may be configured to use the session initiation protocol ("SIP"), the H.323 protocol, the Inter-Asterisk Exchange ("IAX" or "IAX2") or any other protocol designed to allow voice communications over data or IP networks.

According to some embodiments, the Mobile Voice Communications Device 105 may preferably be comprised of hardware elements that are electrically coupled via bus, including a microprocessor, a wireless receiver component, a wireless transmitter component, a computer-readable storage media reader, and a memory. Additionally, the storage media reader is further connected to a storage medium. Additional components include a microphone and speaker, and there may also be additional components communicatively coupled to the Device 105, including an output component, such as a screen or other display, and an input component, such as a keyboard or touchscreen. Those skilled in the art will recognize that this is but one of a number of possible configurations for the Mobile Voice Communications Device 105.

According to various embodiments, the Mobile Voice Communications Device 105 is configured to receive at least 2 nonoverlapping ranges of frequencies of electromagnetic waves. According to some embodiments, each range is associated with a different communications service provider. The range may be comprised of one, or more, signals from a wireless carrier or other provider of communications services. The range may be comprised of any combination of modulated, multiplexed, digitized, packetized or otherwise encoded signals from a provider of communications services. According to some embodiments, the range comprises at least one modulated voice signal. As used herein, modulated voice signal includes any audio or voice signal that is digitally encoded. The range may include signals from any combination of the following: WiMax, WiFi, Bluetooth, UWB, GSM, CDMA, PHS, other such standards, or any other frequency band or bands used to provide communications services.

Service providers for cellular and other systems are typically granted or otherwise purchase ranges of frequencies for use in certain geographic areas. Merely by way of example, the AMPS standard encompasses approximately the 824-890 MHz range, parts of GSM encompass 890-960 MHz, and UMTS 1885-2200 MHz. Different contiguous ranges, or blocks, of frequencies within such ranges may be allocated to service providers. The ranges of frequencies granted to different service providers typically do not overlap in a given geographic region. Individual service providers are typically granted contiguous blocks of frequency (often one for transmit and a different one for receive), and that is a reason the Device 105 may be configured to receive the nonoverlapping ranges of frequencies.

It is worth noting that VoIP service providers may provide service by connecting to a Device via a range of shared electromagnetic frequencies. For example, a Device 105 may receive VoIP service with connectivity to the Internet 130, which may be available over a shared wireless connection. However, even in such circumstances, the Device 105 may still measure average power received from a nonoverlapping range of electromagnetic frequencies that enable Internet 130 connectivity, and thereby VoIP service. An example of this type of connection is a "WiFi" hot spot that complies with the wireless standards developed in association with IEEE 802.11, and is discussed below.

According to various embodiments of the invention, at least 2 nonoverlapping ranges of frequencies of electromagnetic waves are received by a Device 105. The Device 105 may be coupled to any number of antennas and receivers configured to receive the at least 2 nonoverlapping ranges of frequencies. The specific ranges of frequencies to be received may be dictated by the configuration and choice of components of the Device 105. Alternatively, the components may allow the ranges of frequencies to be received to be modified by the user, the Device 105, the CIP 115, or a service provider. The Device 105 may be configured to measure the average power received from each range of frequencies, in a manner known in the art. As noted above, each range may be comprised of one, or more, signals from a wireless carrier or other communications service provider. This average power measurement may thus comprise a signal strength, which is often referred to as Receive Signal Strength ("RSSI"). The average power measurement may also comprise a signal to noise ratio. A number of different handset design and cost considerations may govern the configuration of the Device 105. The design and tradeoffs associated with such handsets and alternative devices are well known by those skilled in the art. Such devices are often referred to in the art as multi-mode phones, although a Device 105 does not have to be a multi-mode phone. Some such phones are referred to as quad band phones.

According to some embodiments, the Device 105 transmits a communications signal which includes information indicating an average power received for each range of the plurality. The communications signal may be directed to reach a CIP 115, as described below. A communications signal may also include location based data for a device (such as GPS coordinates). Average power and location based data may also be distributed over many packets, or may be otherwise broken down. However, as used herein, "communications signal" should be interpreted broadly to include multiple packets or other multiplexed data. In some embodiments, the communications signal is transmitted via General Packet Radio Service ("GPRS"). In other embodiments, the communications signal may comprise a wireless signal to be transmitted via WiFi, WiMax, CDMA, UMTS, SMS, 3G systems, or any other wireless data means. Alternatively, the communications signal may comprise a subset of the control messaging to the Device 105. The average power received may be transmitted by the Device 105 at different intervals related to time and movement of the Device 105. According to some embodiments, the transmission occurs at regular time intervals.

A Device 105 may receive information which indicates an optimal range of frequencies, and such information may originate at a CIP 115. As noted above, the different ranges may each be associated with a different provider of communications services. A Device 105 may be configured to initiate a phone call through the service provider associated with the optimal range. Also, a Device 105 may be configured to transfer an ongoing call to an alternative service provider associated with a newly determined optimal range, without disrupting the ongoing call. In some embodiments, a Device 105 may be configured to enable the connection to the different providers through one or a series of MVNO relationships. A Device 105 may be configured to receive and transmit different ranges of nonoverlapping frequencies. The configuration options discussed herein are within the knowledge of those skilled in the art, and those of such skill will recognize the different options available.

The Mobile Voice Communications Device 105 may also be coupled to a receiver component which enables the reception of data identifying the location of the Device 105. This data may be referred to hereinafter as "location based data," or "set of data identifying the location of the device." The receiver may be coupled to the Mobile Voice Communications Device 105 in any suitable manner known in the art. By way of example, it may be an integrated component or may be a stand alone receiver otherwise communicating with the Mobile Voice Communications Device 105. In any case, a Mobile Voice Communications Device 105, as the term is used herein, comprises any of the foregoing configurations.

The location based data may be in the form of Satellite location information (such as Global Positioning System ("GPS") information), cellular location information, network analysis of location information, location information specific to a building, or other means for location determination.

The location based data may be based on triangulation using cellular towers or access points. Alternatively, cellular carriers may employ other means of locating cellular telephones and other mobile computing devices using cellular towers. By way of example, the time difference of arrival, angle of arrival, and location pattern matching methods are well known in the art as alternative means of obtaining location information. According to some embodiments, the location based information may be in the form of GPS coordinates. The location based data may be transmitted by the Device 105 to the CIP 115 according to various embodiments of the invention. The location based data may be stored in the Database 115*a*, as described below.

B. CIP: According to various embodiments, a Controlled Interface Point ("CIP") 115 is a node associated with or comprised of a server computer system, and is configured to be in communication with the Mobile Voice Communications Device 105. Such a server computer system may include, for example, one or more server computers, personal computers, workstations, web servers, or other suitable computing devices. The CIP may be associated with one or more fixed or variable IP addresses, and may be connected to the Internet 130. According to some embodiments, the communication link between the Device 105 and CIP 115 is through a Mobile Communications Base Station 110, described below. The link connecting a CIP 115 and the Device 105 may be over any communications link upon which data can be transmitted, whether it be via cellular, data, or other means. It may be a communications link that is associated with a communications service provider. The communications link may include any number of intermediate devices, including routers, switches, or other devices that receive and transmit communication signals. In a communication system, there may be any number of CIPs 115, distributed on the basis of geography, traffic, or other alternatives. Each CIP 115 may be in communication with other CIPs 115, although such communication links are not required.

A CIP 115 may be configured to receive a communications signal from one or more Devices 105, each signal indicating an average power received for each range of the plurality of ranges of nonoverlapping electromagnetic frequencies. According to some embodiments, the average power for each range is compared with the cost associated with each range stored in the cost database (described below), and the optimal range of frequencies is determined based on the cost and average power information for each range. The CIP 115 may then transmit the optimal range to the Device 105. Alternatively, the information (or a subset thereof) stored in the cost database may be transmitted to, or otherwise preconfigured on, the Device 105. The Device 105 may be then be configured to make the determination regarding the optimal range. Modifying the cost database and Device 105 to accommodate such a change is well within the knowledge of one skilled in the art. In some embodiments, the CIP 115 may also store the average power information in the average power database (described below).

A CIP 115 may be configured to direct a Device 105 attempting an outgoing call to connect to a service provider associated with the optimal range of frequencies. In addition, a CIP 115 may be configured to direct an incoming phone call from the PSTN 125 to the Service Provider Equipment 120 of the communication service provider associated with an optimal range. A CIP 115 may access the average power and cost databases (described below) in determining the optimal range. A CIP 115 may determine an optimal range by determining a geographic region based on the location based data received from a Device 105, and then referring to the average power and cost databases for that region. A CIP 115 may also rely on the average power received from a Device 105 without reference to the average power database. In addition, a CIP 115 may weight the average power reading for different ranges of frequencies differently. For example, average power requirements for WiFi connectivity may differ from CDMA. A CIP 115 may account for these differences in determining the optimal range.

According to some embodiments, a CIP 115 may include or otherwise be associated with at least one Database 115*a*. According to some embodiments, the Database 115*a* contains information related to a cost associated with each range of the plurality of nonoverlapping ranges of the electromagnetic frequencies. The Database 115*a* may include any number of tables and sets of tables. Application software running on a server computer system associated with the CIP 115 may query the Database 115*a*, and produce forms, reports, or other output as dictated by the application software. The Database 115*a* may be incorporated within the CIP 115 (e.g., within its storage media), or may be a part of a separate system associated with the CIP 115. The Database 115*a* may be fully located within a single facility or distributed geographically. The Database 115*a* may be organized in any manner different than described above to provide the functionality called for by the various embodiments, as known by those skilled in the art.

According to various embodiments, the Database 115*a* includes a cost database listing of the cost associated with each range of electromagnetic frequencies included in the plurality of nonoverlapping ranges. As noted above, each range of frequencies may be associated with a provider of communication services. Therefore, a cost may be associated with a specific provider of communication services. The cost associated with each range may be applicable to geographic areas of any size. The cost of a range may be provided directly by the communications service provider, may be determined by the CIP 115, or may be determined by other means. Cost may be listed on a per call, per minute, or any other basis. Each range may be associated with more than one service provider, which might be the case when a single communications provider has multiple MVNO relationships with different vendors. In such cases, the database would choose the best cost option from the multiple vendors in listing the cost associated with a given range. Such alternative configurations are well with the abilities of one skilled in the art.

According to various embodiments, a CIP 115 receives a communications signal originating at a Device 105 which includes information indicating an average power received by that Device 105 for each range of the plurality. The average power information may be stored in the Database 115*a*. According to various embodiments, the Database 115*a* includes an average power database specifying the average power received from at least one Device 105, indicating the average power received by the Device 105 for each range of the plurality of ranges of electromagnetic frequencies received. The average power database may include average power listings for any number of devices. The average power listings included in a database 115*a* may be grouped or otherwise allocated to specific geographic regions. According to some embodiments, such geographic regions may be modified on a dynamic basis. According to various embodiments, the location of a Device 105 is determined by analyzing the location based data. This analysis may take place on the Device 105, the CIP 115, or elsewhere. According to various embodiments, a CIP 115 may query the average power database to determine the optimal range. A CIP 115 may also use the average power database in combination with average power information from a Device 105.

According to various embodiments, the Database 115*a* includes a location database, which stores the location based data received from at least one Device 105. The Database 115*a* may thus include real time and historic locations of a Device 105. The location based listings included in the Database 115*a* may be associated with or otherwise grouped with average power and cost information, and specific geographic regions. According to some embodiments, the location database may be queried and analyzed to determine the probability of certain movement patterns associated with a Device 105. This location based heuristic engine can predict likely mobility patterns based on past movements. The optimal range of frequencies may be determined based on the likelihood of certain movement patterns. A variety of different prediction algorithms may be used, and creating such algorithms is well within the ability of those skilled in the art.

According to certain embodiments, a CIP 115 may also make optimal range of frequency determinations based in part on security considerations. By way of example, different levels of security could be associated with national wireless carriers (higher confidence) and VoIP services over a shared connection (lower confidence). In addition, different security levels might be available within a given range of frequencies. Other forms of collectable data could be used as well in the determination of an optimal range of frequencies.

C. Base Station: The Mobile Communications Base Station 110 comprises a facility which sends and receives radio signals to and from the Mobile Voice Communications Device 105. The signals may be for purposes of cellular telephone communications. The Mobile Communications Base Station 110 may also be comprised of a wireless access point which sends and receives radio signals to and from the Mobile Voice Communications Device 105. Such a wireless access point includes any device that provides a wireless interface. By way of example, such access points may be "WiFi" hot spots that comply with the wireless standards developed in association with IEEE 802.11. Those skilled in the art will recognize the myriad of potential configurations surrounding the Mobile Communications Base Station 110.

In addition to providing a link between the Device 105 and a CIP 115, a Base Station 110 may also link the Device 105 and the Service Provider Equipment 120. Different Base Stations 110 may provide the communications links between the Device 105 and the Service Provider Equipment 120 of different communication service providers. Different Base Stations 110 may provide the communications links between the Device 105 and the CIP 115 and between the Device 105 and the Service Provider Equipment 120. Any of the communications links discussed herein may include any number of intermediate devices, including routers, switches, or other devices that receive and transmit communication signals.

D. Service Provider Equipment: As noted, the Device 105 may connect to Service Provider Equipment 120 from one or more communications service providers according to various embodiments of the invention. The Service Provider Equipment 120 may provide an interface between the Device 105 and the public switched telephone network ("PSTN") 125.

The Service Provider Equipment 120 may be comprised of a mobile switching center ("MSC"). To provide connectivity between phone users 105*a* and the Device 105, the MSC may also be in communication with a telephone network such as the PSTN 125, and may query or otherwise utilize a Signal Control Point ("SCP"), additional components that are well known to those skilled in the art.

According to other embodiments, the Base Station 110 may be communicatively coupled or otherwise in communication with the Internet 130 or an other network, which enables a connection to a VoIP switch (i.e., Service Provider Equipment 120). To provide connectivity between phone users 105*a*, the VoIP switch may also be in communication with a telephone network such as the PSTN 125.

According to some embodiments, the Device 105 may receive a communications signal indicating an optimal range, and initiate an outgoing call via that range. Merely by way of example, the Device 105 may connect to an MSC (i.e., Service Provider Equipment 120) associated with a service provider via a Base Station 110, using the optimal range of frequencies. The MSC may request instructions from a controlling device such as an SCP, and the call may be connected as known in the art. According to some embodiments, the CIP 115 may, directly or indirectly, guide an incoming call directed at a Device 105 to an optimal range by providing information about the Service Provider Equipment 120 associated with the optimal range. Merely by way of example, the incoming call may be routed by a CIP 115 to the proper MSC (i.e., Service Provider Equipment 120) of the service provider associated with the optimal range of frequencies. In this embodiment, the CIP 115 may be configured to provide much of the functionality of an SCP.

According to some embodiments, a CIP 115 may determine that a new optimal range exists during an ongoing call. This new optimal range might be based on cost or power issues. The CIP 115 may, directly or indirectly, instruct the Device 105 to initiate a second connection via the new optimal range, while maintaining the ongoing call. Merely by way of example, the Device 105 may connect to different service providers simultaneously, through an MSC (i.e. Service Provider Equipment 120) and a VoIP switch (i.e. Service Provider Equipment 120), using the preexisting range and the optimal range of frequencies. The Device 105 may then disconnect from the provider associated with the preexisting range once the optimal range is connected.

II. Different Embodiments: With a broad understanding of the underlying communications system, an examination of various embodiments of the invention may now be undertaken.

Figure 2:
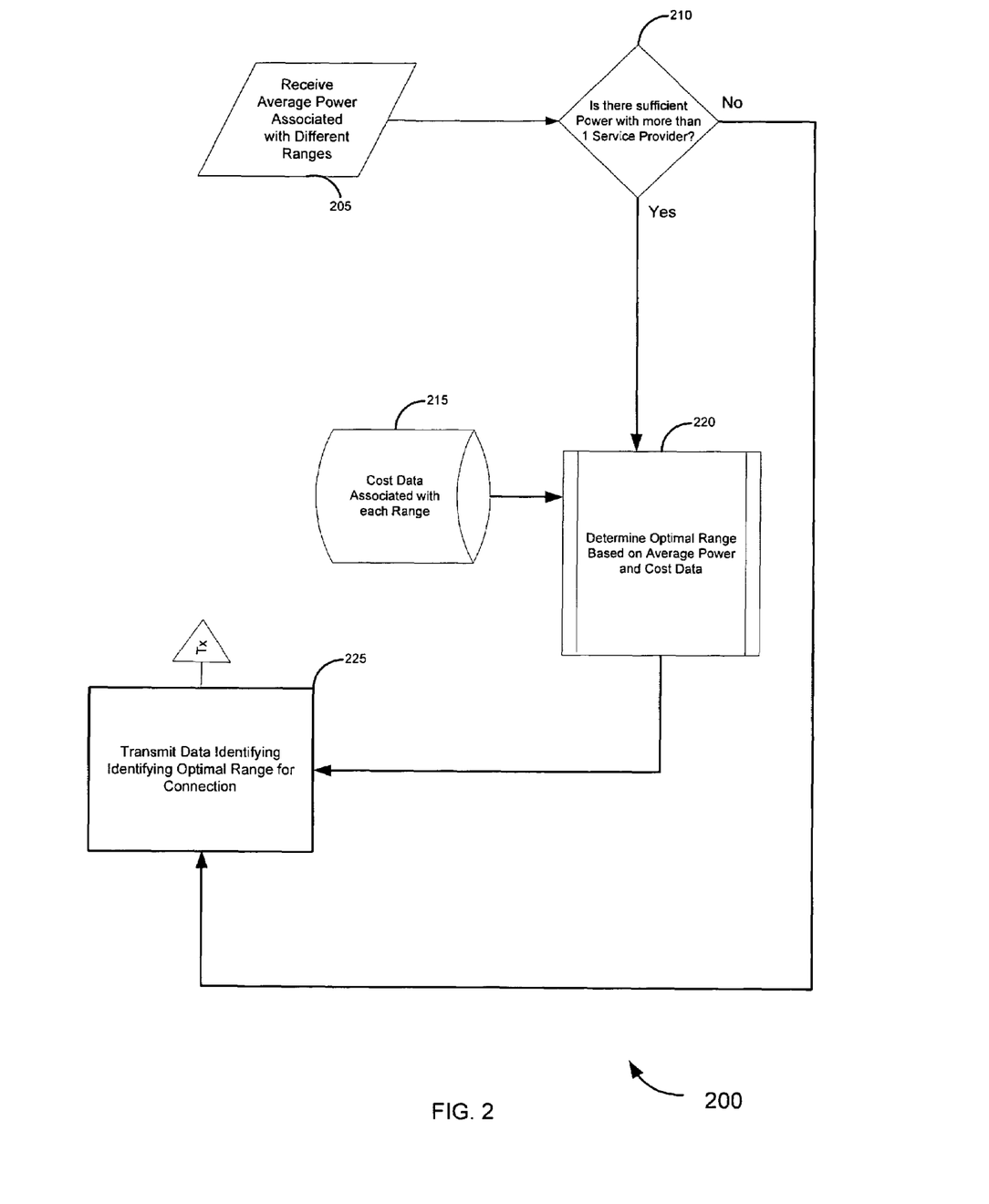
FIG. 2 is a flow diagram that illustrates a process for determining an optimal range of electromagnetic frequencies according to various embodiments of the present invention.

A. General Decision Format: The decision factors 200 dictating the optimal range of frequencies according to various embodiments of the invention is illustrated in FIG. 2. According to such embodiments, one or more communications signals, each indicating an average power received on a Device 105 for each range of a plurality of nonoverlapping ranges of frequencies of electromagnetic waves, is received at block 205. Optionally, the signal may be stored in a database, associated with one or more specific geographic areas, combined or averaged with other communication signals indicating an average power received for each range, or may simply remain associated with a specific Device 105.

According to some embodiments, a first determination at block 210 is whether there is sufficient power associated with more than one range of frequencies. If so, the data associating a cost with each range of frequencies is provided at block 215. As noted above, each range of frequencies may be associated with a different provider of communications services. The average power data, whether from a Device 105 or series of Devices 105, and the cost data are compared at block 220, and an optimal range of frequencies is determined. In some embodiments, the optimal range is associated with a specific provider of communications services, and the lowest cost+ best power provider is selected. Different weights may be assigned to the "cost" and "power" factors. By way of example, higher weight may be applied to the "cost" if there is an abundance of power in more than one range. According to these embodiments, the optimal range (which may thereby indicate the optimal service provider) is then transmitted to a Device 105 at block 225. The Device 105 may then connect with the optimal service provider.

B. Server Implementation: According to other embodiments, illustrated in FIG. 3, a method 300 of determining an optimal range of frequencies of electromagnetic waves among a plurality of nonoverlapping ranges of frequencies of electromagnetic waves is identified. The method is initiated, at block 305, by providing a server computer system, which may be comprised of a CIP 115. At block 310, the system receives a communications signal from a mobile voice communications device indicating an average power received for each range of the plurality. According to some embodiments, and as noted above, each range may be associated with a specific provider of communication services. At block 315, the system receives information which associates a cost with each range of the plurality from the cost database described above, or an alternative database source.

Figure 3:
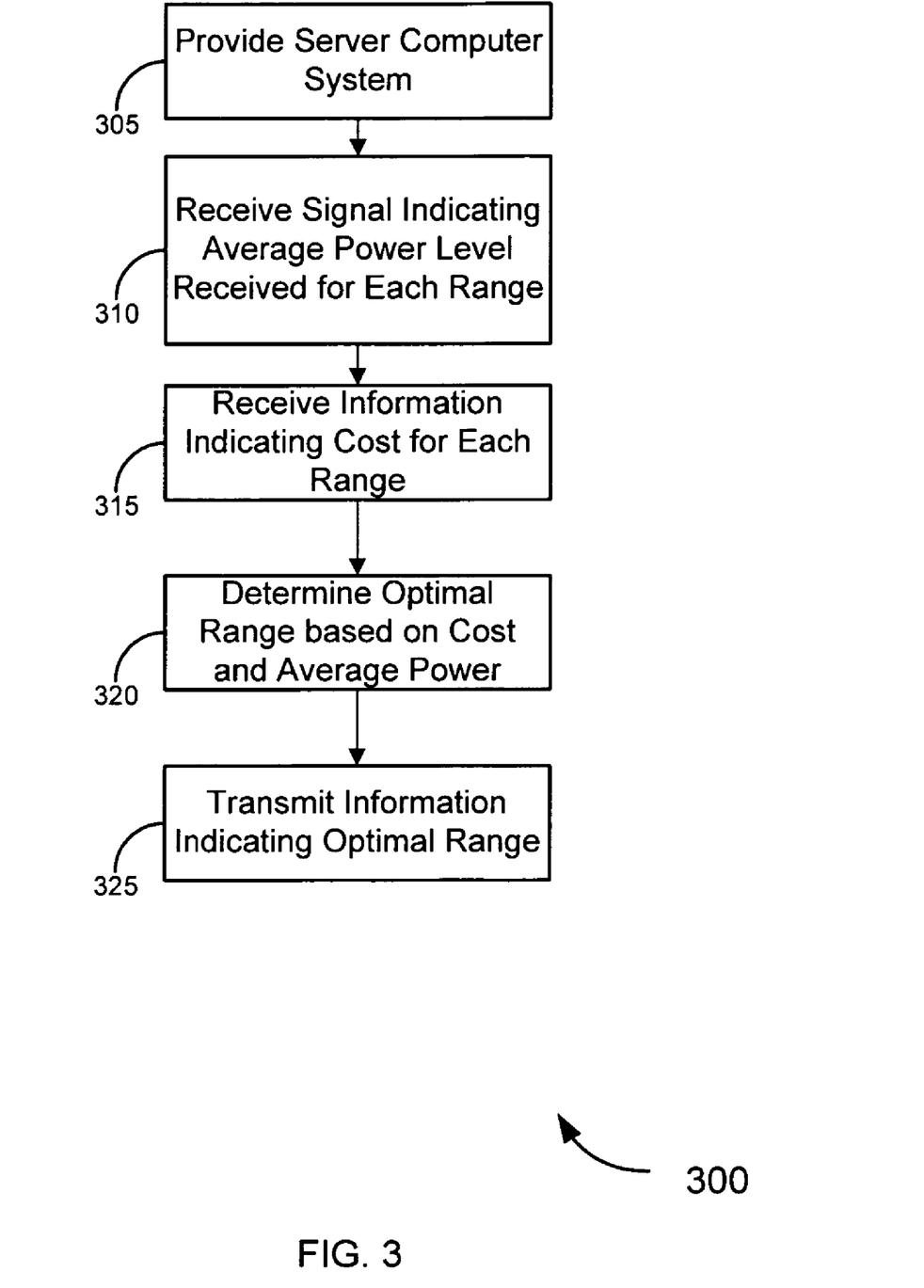
FIG. 3 is a flow diagram that illustrates a method of determining an optimal range of electromagnetic frequencies according to various embodiments of the present invention.

At block 320, the system determines the optimal range of frequencies, based on the cost associated with each range of the plurality and the average power received from each range of the plurality. As noted above, the system may apply different weights to the "cost" and "power" factors. The optimal frequency range may be associated with a provider of communication services. At block 325, the system transmits a communications signal indicating the optimal range of frequencies.

C. Device: According to other embodiments, illustrated in FIG. 4, a configuration 400 of a Device 105 which may be used to determine an optimal range of frequencies of electromagnetic waves among a plurality of nonoverlapping ranges of frequencies of electromagnetic waves is identified. At block 405, the Device 105 receives a number of ranges of frequencies of electromagnetic waves, each range associated with a different provider of communications services. At block 410, the Device 105 measures an average power received for each range.

Figure 4:
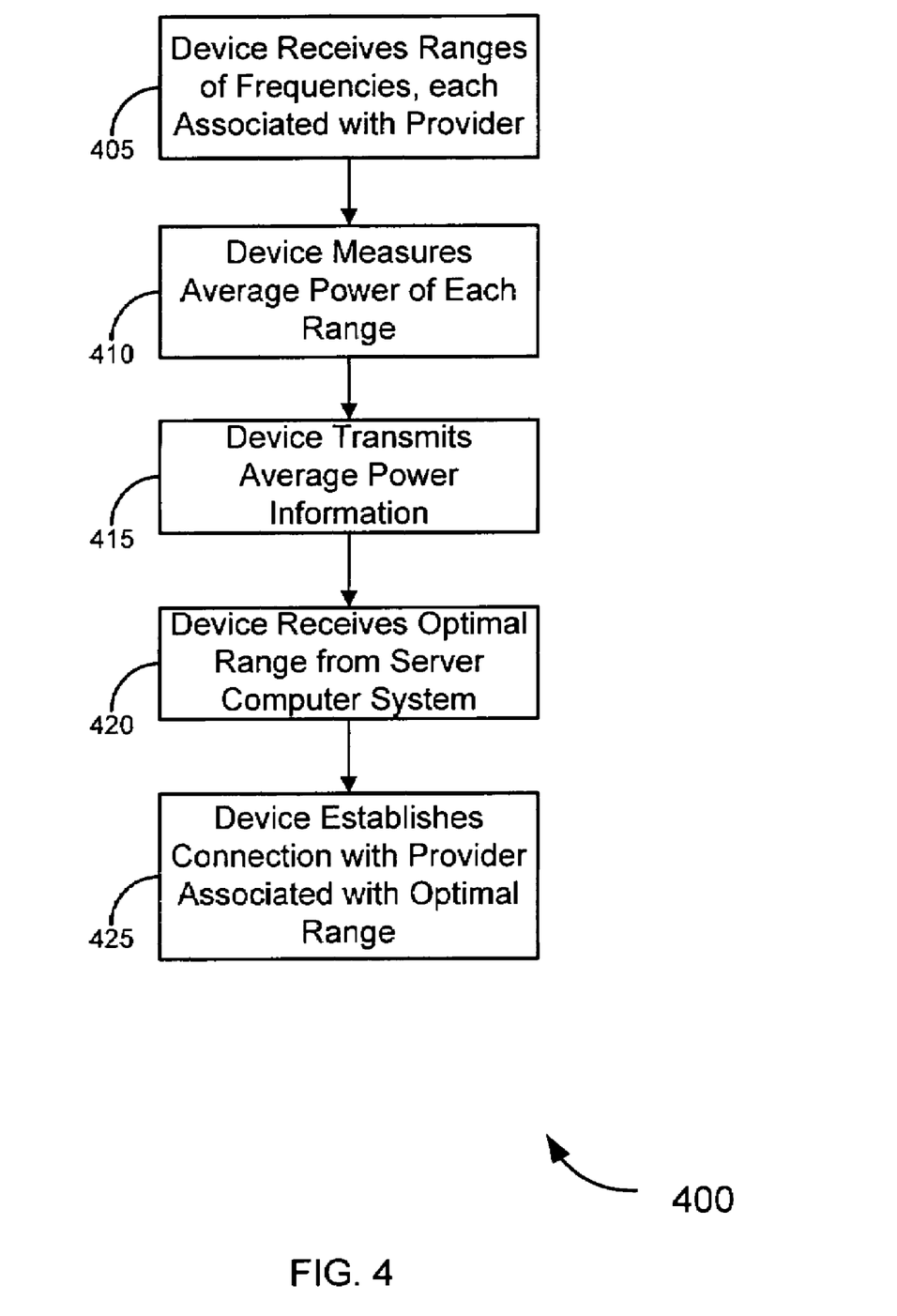
FIG. 4 is a flow diagram that illustrates the configuration of a device used in determining an optimal range of electromagnetic frequencies according to various embodiments of the present invention.

The Device 105 transmits a communications signal at block 415 indicating the average power received for each range. At block 420, the Device 105 receives a communications signal indicating an optimal range based on the average power measured and cost associated with each range. The optimal range may be determined by a server computer system, or, more specifically, a CIP 115. The Device 105 then establishes 425 a connection with the provider associated with the optimal range.

Figure 5:
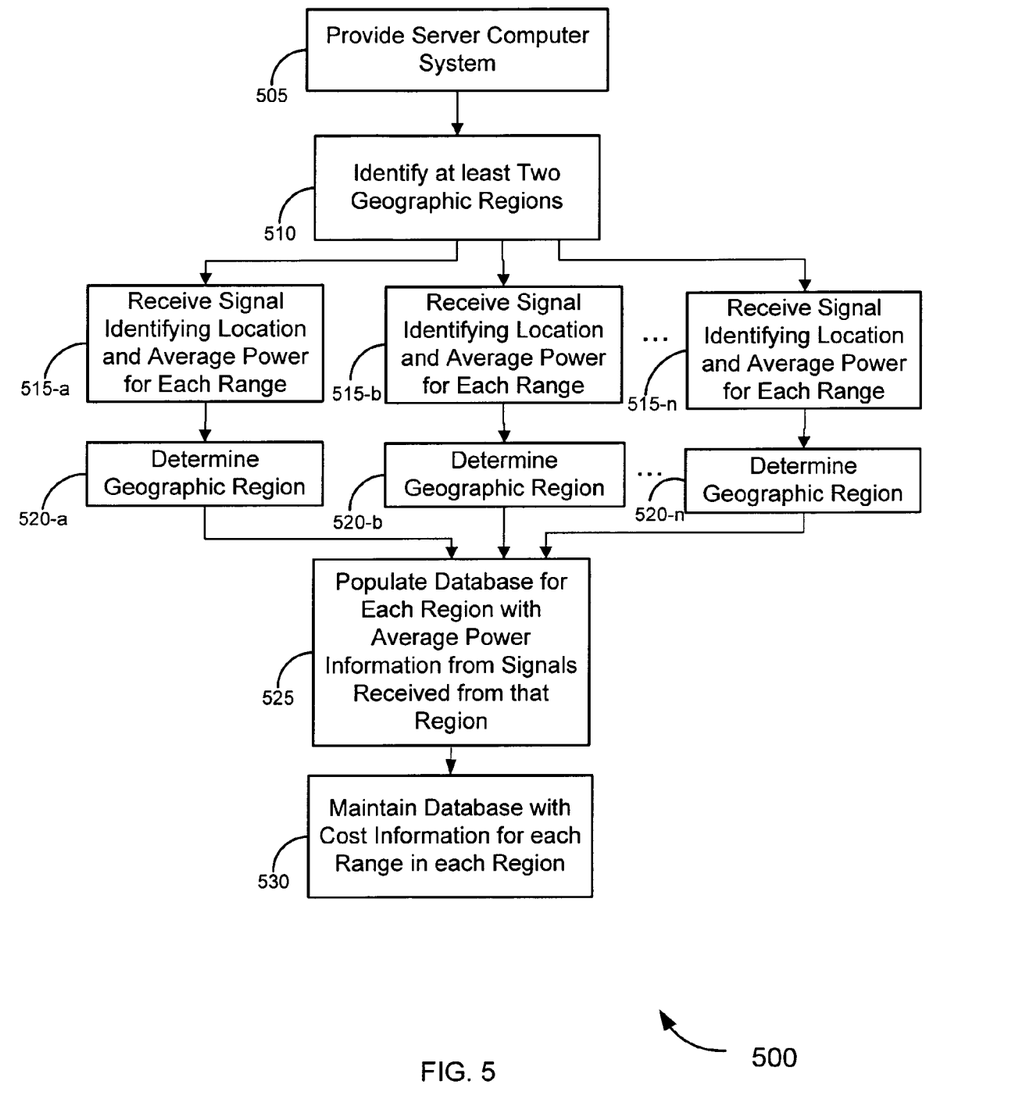
FIG. 5 is a flow diagram that illustrates a method of creating a database containing average power and cost information in different geographic regions according to various embodiments of the present invention.

D. Database: According to still other embodiments, a method 500 of creating a database comprising information associated with cost and an average power received for each of a plurality of nonoverlapping ranges of frequencies of electromagnetic waves in each of a plurality of geographic regions is illustrated in FIG. 5. At block 505, a server computer system is provided. At block 510, the system identifies at least two geographic regions. At block 515-*a*, a communications signal from a Device 105 is received, which indicates an average power received for each range of the plurality, and identifies the first device location. The system determines, at block 520-*a*, that the Device 105 is located in a first geographic region based on the first device location. One or more additional signals are received at block 515-*b*...515-*n*, each indicating an average power received for each range of the plurality of ranges, and identifying the location of a different Device 105. The system determines at blocks 520-*b*...520-*n*, that each different Device 105 is located in an identified geographic region.

At block 525, the system then populates the Database 115*a* with data comprising the average power received for each range of the plurality of ranges, from the signals from each of the Devices 105. At block 530, the Database 115*a* is maintained with information associating a cost with each of the plurality of ranges, in each geographic region, as described above in the discussion of the cost database. According to some embodiments, a Device 105 may query the Database 115*a* to provide an optimal range given the location of the Device 105 in a geographic region.

Figure 6:
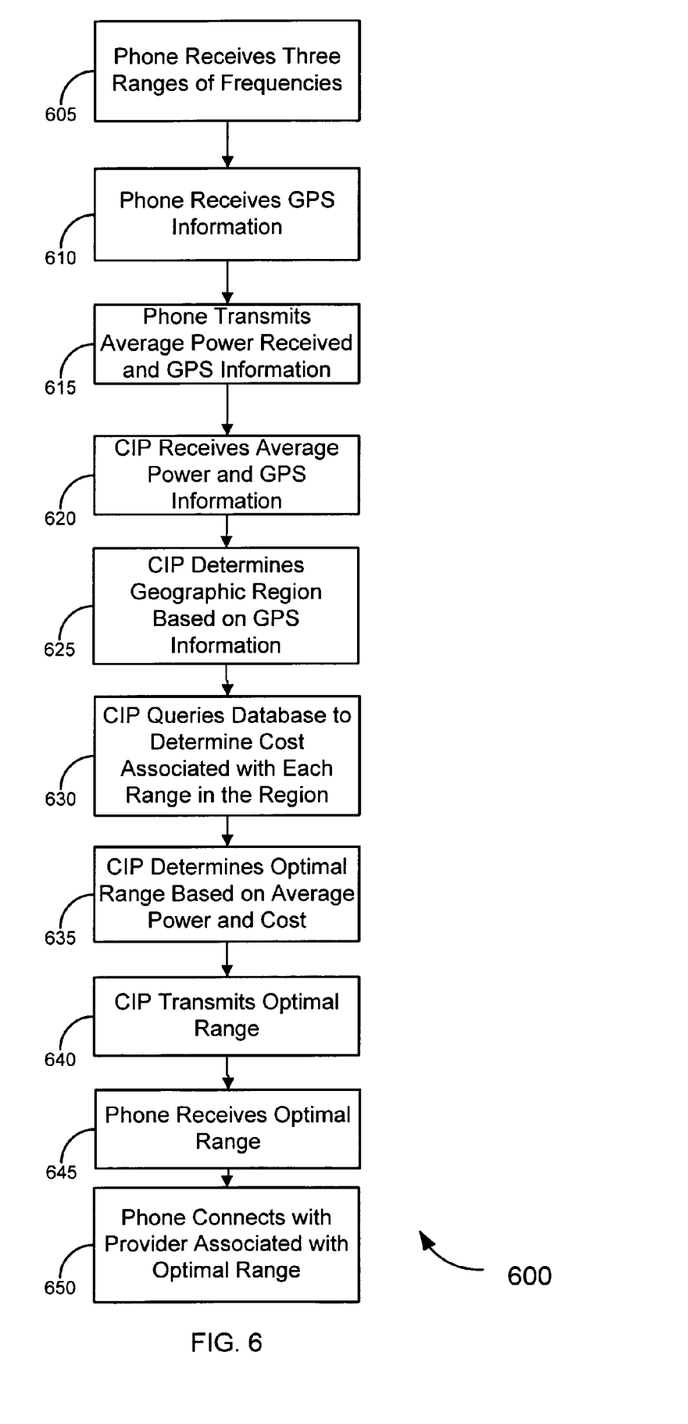
FIG. 6 is a flow diagram that illustrates a method of determining an optimal range of electromagnetic frequencies associated with a communications service provider according to various embodiments of the present invention.

E. Additional Embodiments: Having described certain embodiments, the description of a more specific embodiment may serve to further enable the invention. The following is meant to be exemplary in nature, and in no way limits scope of options available. According to various embodiments of the invention, the Device 105 may be a multi-mode phone configured to send data using GPRS, and is also equipped with a GPS receiver. This exemplary embodiment 600 of the invention is illustrated in FIG. 6. At block 605, the phone receives three, nonoverlapping ranges of frequencies, two associated with different cellular providers, one associated with a VoIP provider. At block 610, the phone receives the GPS data. The average power received for each of the three ranges, and the GPS data, is transmitted to the CIP at block 615 using GPRS.

The CIP 115 receives the average power and GPS information at block 620. The CIP 115 determines, at block 625, the appropriate geographic region based on the GPS data. The CIP 115 queries the Database 115*a* for the cost information associated with the ranges of frequencies and associated service providers at block 630. At block 635, the CIP 115 determines the optimal range based on the average power and cost information, and transmits the optimal range information at block 640. At block 645, the phone receives the optimal range information, and at block 650 establishes a connection with the service provider associated with the optimal range.

It should be noted that the methods, systems and devices discussed above are intended merely to be exemplary in nature. Consequently, various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the above described embodiments may be combined in a similar manner.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A telecommunications system indicating an optimal range of frequencies of electromagnetic waves among a plurality of nonoverlapping ranges of frequencies of electromagnetic waves, the system comprising:
   a mobile voice communications device configured to:
      receive the plurality of nonoverlapping ranges of frequencies of electromagnetic waves; and
      transmit a communications signal indicating an average power received for each range of the plurality; and
   a controlled interface point in communication with the mobile voice communications device, configured to:
      receive the communications signal indicating an average power received for each range of the plurality;

receive information from a database which associates a cost with each range in each of a plurality of geographic regions, wherein the cost associated with one or more of the ranges is different in a first geographic region than in a second geographic region among the plurality of geographic regions;

receive information indicating that the device is located in the first geographic region and is located outside the second geographic region;

determine the optimal range of frequencies based on the cost associated with each range of the plurality in the first geographic region and the average power received from each range of the plurality; and transmit a communications signal indicating the optimal range of frequencies;

wherein each range of the plurality is associated with a different provider of communications services.

2. The system of claim 1, wherein the device comprises a cellular phone.

3. The system of claim 1, wherein the device comprises a VoIP phone.

4. The system of claim 1, wherein:

the device is further configured to receive a set of data identifying the location of the device; and to transmit a communications signal that includes the set of data;

the controlled interface point is further configured to receive the communication signal that includes the set of data, and to store the set of data in the database.

5. The system of claim 4, wherein the set of data identifying the location of the device comprises GPS coordinate data.

6. The system of claim 1, wherein the device is configured to:

receive a communications signal indicating the optimal range; and establish a connection with the provider associated with the optimal range.

7. A method of determining an optimal range of frequencies of electromagnetic waves among a plurality of nonoverlapping ranges of frequencies of electromagnetic waves, which comprises:

providing a server computer system;

receiving a communications signal from a mobile voice communications device indicating an average power received for each range of the plurality;

receiving information which associates a cost with each range of the plurality from a database associated with the server computer system;

receiving information which associates a selected one of a plurality of security levels with each range of the plurality from a database associated with the server computer system;

determining the optimal range of frequencies based on the cost and the selected level associated with each range of the plurality and the average power received from each range of the plurality; and transmitting a communications signal indicating the optimal range of frequencies;

wherein each range is associated with a different provider of communications services.

8. The method of claim 7, wherein each range of frequencies of electromagnetic waves comprises a wireless signal from a wireless carrier operating a cellular system.

9. The method of claim 7, wherein at least one of the ranges is associated with a provider offering cellular phone service via the at least one of the ranges.

10. The method of claim 7, wherein at least one of the ranges is associated with a provider offering VoIP services via the at least one of the ranges.

11. The method of claim 7, which further comprises storing the average power received for each range of information in the database.

12. The method of claim 7, which further comprises receiving a communications signal containing a set of data identifying the location of the device.

13. The method of claim 12, which further comprises storing the set of data in the database.

14. The method of claim 12, wherein the set of data comprises GPS coordinate data.

15. The method of claim 7, wherein the communications signal indicating the optimal range of frequencies further comprises a direction to terminate an existing connection to a provider not associated with the optimal range.

16. The method of claim 15, wherein the existing connection comprises an ongoing phone call, the ongoing phone call is transferred to the connection with the provider associated with the optimal range without disrupting the ongoing phone call.

17. The method of claim 13, wherein the set of data is processed to calculate the probability of movement patterns of the device, and the optimal range of frequencies is further based on the probability of movement patterns.

18. The method of claim 7, which further comprises receiving a plurality of communication signals, each containing information from a different mobile voice communications device indicating:

an average power received for each range of the plurality; and an other set of data identifying the location of the different device;

wherein the information received from the different device is stored in a database, and the optimal range of frequencies is further based on the information received from the different devices.

19. A method of creating a database comprising a cost and an average power received for each of a plurality of nonoverlapping ranges of frequencies of electromagnetic waves, in each of a plurality of geographic regions, which comprises:

identifying a plurality of geographic regions;

receiving a first communications signal from a first mobile voice communications device in a first geographic region, wherein the first signal:

indicates a first average power received for each range of the plurality; and identifies the first device location;

determining that the first device is located in the first geographic region based on the first device location;

receiving a second communications signal from a second mobile voice communications device in a second geographic region, wherein the second signal:

indicates a second average power received for each range of the plurality; and identifies the second device location;

determining that the second device is located in the second geographic region based on the second device location;

maintaining the database with information which associates a cost with each range of the plurality in the first geographic region, and associates a cost with each range of the plurality in the second geographic region, wherein the cost associated with one or more of the ranges is different in the first geographic region than in the second geographic region; and populating the database with data comprising the average power received for each range of the plurality in the first geographic region and each range of the plurality in the second geographic region.

20. A method of claim 19, wherein each mobile voice communications device transmits the communication signal at regular time intervals.

21. A method of claim 19, wherein:
the first receiving step comprises receiving a plurality of communication signals, each signal of the plurality of signals containing information from a different mobile voice communications device in the first geographic region, the information in each signal of the plurality of signals indicating:
an average power received for each range of the plurality of ranges;
an other set of data identifying the location of the different device;
the first determining step comprises determining that each different device is located in the first geographic region based on the other set of data; and
the populating step further comprises populating the database with an average power received for each range of the plurality of ranges from the information in each signal of the plurality of signals, and further comprises calculating an average of the average power received for each range of the plurality of ranges.

22. A method of claim 21, wherein the database is queried by a mobile voice communications device in the first geographic region, and an optimal range of frequencies of electromagnetic waves is selected based on the cost associated with each range of the plurality of ranges in the first region, and the average power received for each range of the plurality of ranges from the information in each signal of the plurality of signals.

23. A mobile voice communications device, wherein the device is configured to:
receive a plurality of nonoverlapping ranges of frequencies of electromagnetic waves, each range associated with a different provider of communications services;
measure an average power received for each range;
transmit a communications signal indicating the average power received for each range and containing a set of data identifying a location of the device;
receive a communications signal indicating an optimal range determined by a server computer system, the optimal range based on:
the average power measured, a selected security level, and a cost associated with each range, wherein the cost associated with one or more of the ranges is different in a first geographic region than in a second geographic region among a plurality of geographic regions; and
the probability of movement patterns of the device calculated by processing changes in the location of the device; and
establish a connection with the provider associated with the optimal range.

24. The device of claim 23, wherein the device comprises a VoIP phone.

25. The device of claim 23, wherein the device comprises a cellular phone.

26. The device of claim 23, wherein the device transmits the communications signal at regular time intervals.

27. The device of claim 23, wherein the device is further configured to terminate an existing connection to a provider not associated with the optimal range.

28. The device of claim 27, wherein the existing connection comprises an ongoing phone call, the ongoing phone call is transferred to the connection with the provider associated with the optimal range without disrupting the ongoing phone call.

29. The device of claim 23, wherein the device is further configured to receive a set of data identifying the location of the device.

30. The device of claim 29, wherein the data which identifies the location of the device comprises GPS coordinate data.

31. The system of claim 1, wherein:
the controlled interface point is further configured to calculate probability of certain movement patterns of the device using a location-based heuristic engine; and
the optimal range of frequencies is further based on the probability of certain movement patterns of the device.

* * * * *